W. WESTBURY.
GLASS DRAWING APPARATUS.
APPLICATION FILED OCT. 3, 1917.
1,326,241.
Patented Dec. 30, 1919.
2 SHEETS—SHEET 2.
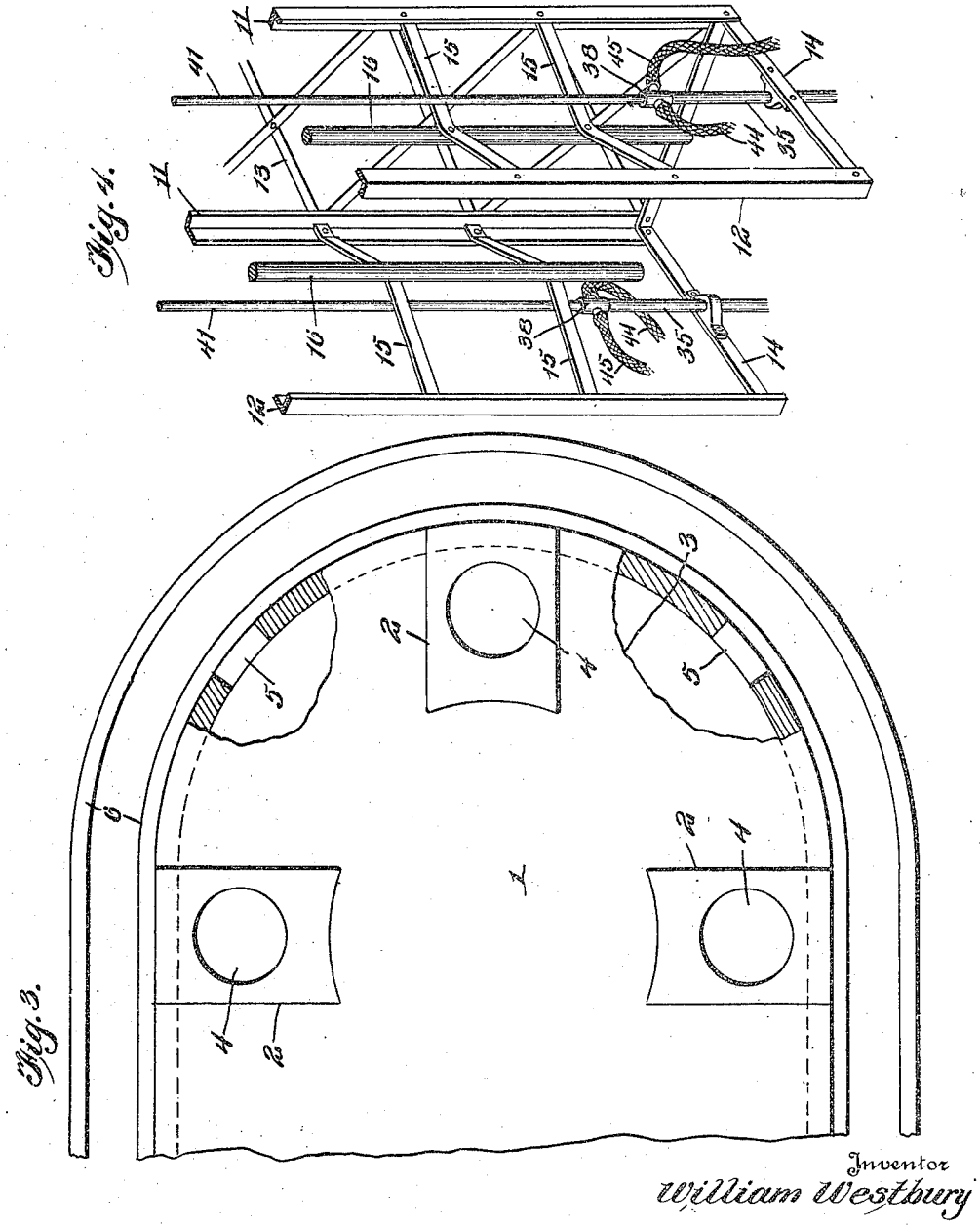

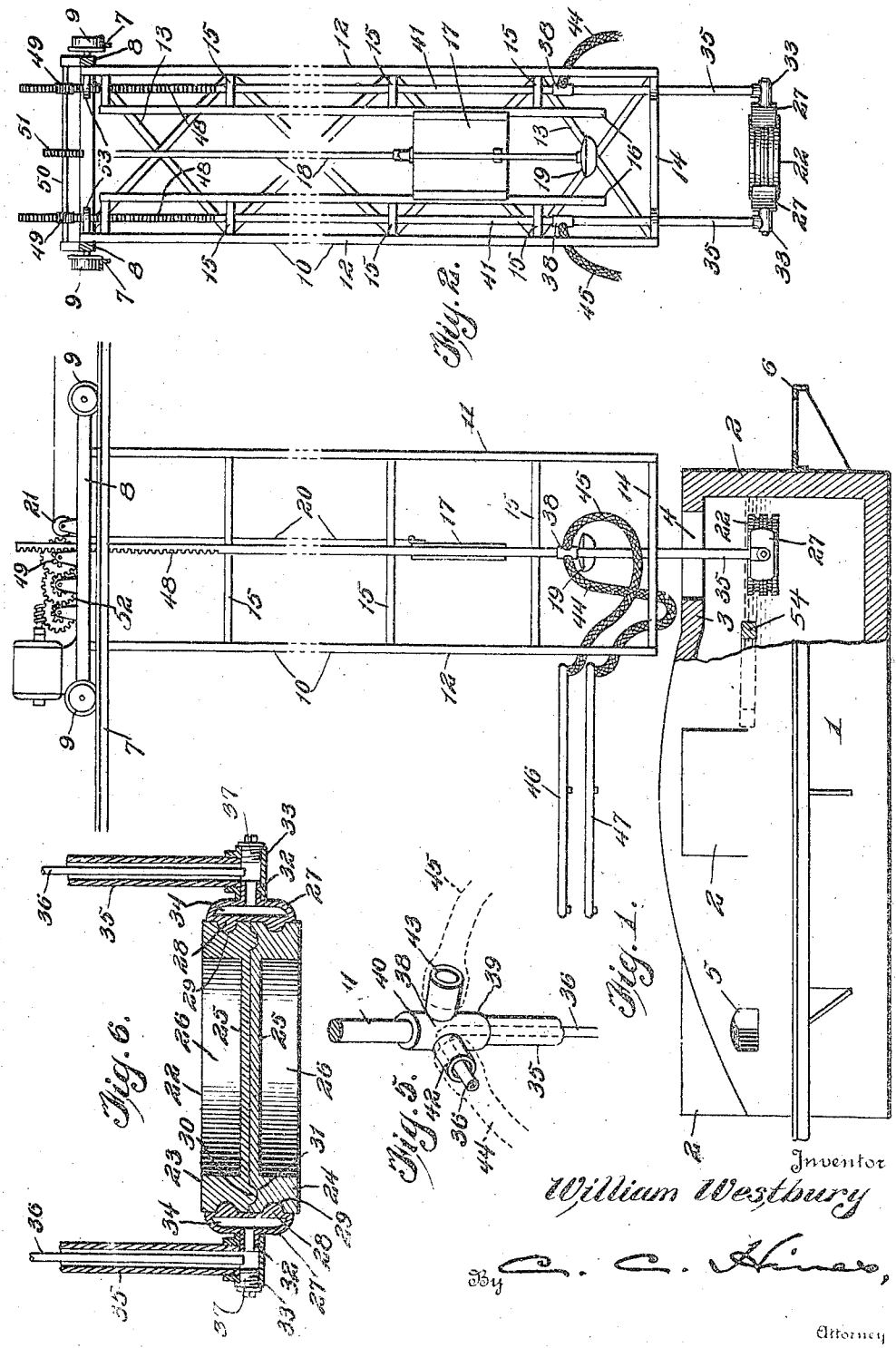

UNITED STATES PATENT OFFICE.

WILLIAM WESTBURY, OF OKMULGEE, OKLAHOMA.

GLASS-DRAWING APPARATUS.

1,326,241.  Specification of Letters Patent.  Patented Dec. 30, 1919.

Application filed October 3, 1917. Serial No. 194,496.

*To all whom it may concern:*

Be it known that I, WILLIAM WESTBURY, a citizen of the United States, residing at Okmulgee, in the State of Oklahoma, have invented new and useful Improvements in Glass-Drawing Apparatus, of which the following is a specification.

This invention relates to improvements in glass drawing apparatus, the object of the invention being to provide improved means for supporting a drawing pot and raising and lowering the same with relation to the drawing opening, for keeping the pot supports cool, and for bodily transferring the pot and drawing tool back and forth between the glass furnace and the pent house.

A further object of the invention is to provide pot and carriage controlling mechanism which may be employed for use in a process in which the charge of glass for the draw is either dipped or ladled into the pot from the glass furnace, and in connection with a furnace which may be provided with means whereby the charges of glass may be ladled therefrom for transfer to the pot when a ladling operation is employed.

With these and other objects in view, the invention consists of the features of construction, combination and arrangement of parts hereinafter fully described and claimed, reference being had to the accompanying drawings, in which:

Figure 1 is a side elevation, partially in section, of a glass melting furnace, pot and drawing tool controlling means, and pot support cooling means embodying my invention;

Fig. 2 is a front elevation of the vertically movable frame, overhead carriage and the pot and drawing tool supporting and operating means carried thereby;

Fig. 3 is a top plan view of a portion of the glass melting furnace, with parts broken away and in section to show a feature of construction;

Fig. 4 is a fragmentary perspective view of parts shown in Fig. 2;

Fig. 5 is a detail perspective view of one of the tubular pot supports, showing the conducting coupling and the rack rod connected therewith; and Fig. 6 is an enlarged vertical section through one form of pot which may be employed.

Referring to the drawings 1 designates a glass melting furnace, of that type wherein the body of glass to be used is melted by suitable heating means, and which is provided with one or more drawing stations 2, a furnace having several of such drawing stations arranged in a curved line being shown in the present instance. These drawing stations may be of a type which directly communicate with the body of the furnace or are in the form of offsets or dog-houses communicating therewith, each drawing station having a top stone or wall 3 provided with a drawing opening 4. Where the apparatus is to be used in a method in which the drawing pot is filled with successive charges of glass removed from the furnace at a point more or less remote from the drawing opening, the furnace may be provided with one or more openings 5 for the insertion and withdrawal of the ladle. In the type of furnace shown, these openings are preferably arranged between the drawing stations 2, and the ladle (not shown) which is to be employed may be mounted upon a carriage arranged to travel upon a track 6 outside the furnace, whereby the ladle may be successively moved between the ladling openings and the drawing stations for extracting charges of glass from the furnace and supplying the same to the pots.

Arranged above the furnace is an overhead track 7 mounted, in practice, upon suitable supports and extending from a point above the furnace to a pent house (not shown). An overhead carriage 8 is provided with wheels or rollers 9 to travel upon this track, and depending from this carriage 8 is a supporting and guide frame 10 which, when the carriage 8 is in operative position above the furnace, depends from the carriage to a point above the particular drawing opening 4 in connection with which it is used, it being understood that a drawing unit composed of an overhead carriage, a supporting and guide frame, a drawing pot and a drawing tool is employed in connection with each drawing opening. The frame 10 is preferably of the open-work skeleton type having a rear wall and side walls but being minus a front wall or entirely open at the front so that the operator may have convenient access to the working parts. The frame is also open at the top and bottom to accommodate and provide for the movement of the pot and drawing tool controlling connections. As shown in the present instance, the frame 10 consists of a pair of rear corner posts 11 and a pair of front corner posts 12, preferably made of angle iron, the rear posts being connected with each other by connecting slats and braces 13 and with the front posts by connecting slats 14 and 15. In practice, the frame 10 may be arranged to engage suitable guides (not shown) on the reinforcing stays or uprights of the furnace body, to brace and maintain it in correct working position above the drawing opening.

The frame 10 supports the guides 16 of the draw carriage 17 which is vertically movable thereon, said guides 16 being connected with the slats 15 which are bent into V-shape or offset inwardly to properly dispose said guides on the interior of the frame. The carriage 17 supports the drawing tool composed of the air feed or blow pipe 18 carrying the bait 19, said pipe 18 being detachably connected with the carriage for the usual take-down action after the cylinder is formed, and being coupled in any suitable manner to an air supply pipe leading from a suitable source of air supply for the admission of air to the cylinder during the drawing action. The carriage 17 is connected with a hoisting cable 20 which passes upwardly over a guide or direction pulley 21 on the overhead carriage 8 and which, in practice, is connected to and operated by a hoisting drum and gear of any type commonly employed, and which may be mounted upon the carriage 8 or within the pent house. Provision is thus made for the raising and lowering of the drawing tool in the usual manner and for mounting said tool for travel with the frame 10 between the glass melting furnace and the pent house or for bringing the drawing tool to such a position as to admit of the cylinder being removed or taken down in a ready and convenient manner after being drawn.

The carriage 10 also supports a drawing pot 22. This pot may be in the form of a single closed bottom pot, but is shown in the present instance in the form of a double pot, composed of oppositely disposed or superimposed pot sections 23 and 24 having their closed bottom portions 25 arranged in abutting contact, the glass containing cavities 26 of the respective pot sections being arranged to face in opposite directions. The pot sections 23 and 24 are detachably connected and held in assembled relation by diametrically disposed clamping members 27 having ribs or projections 28 engaging grooves or recesses 29 in the pot sections, the meeting faces of said pot sections being also provided with interfitting connections to maintain them in alinement, such as ribs or tongues 30 upon the bottom of one pot section engaging grooves or recesses 31 in the bottom of the other pot section. With this construction, the pot sections are adapted, upon being released from the clamps 27, to be disconnected so that new pot sections may be applied for use whenever necessary or so that, in case of damage or injury to one pot section, another may be conveniently substituted in its place. The pot is reversible to alternately reverse the positions of the pot sections to dispose one in receiving position and the other in draining position, and to this end the clamps 27 are provided with horizontally projecting spindles or trunnions 32 which are journaled in T-shaped bearing members 33, the construction being such that the pot is adapted to be turned over by means of a suitable tool or implement to reverse the positions of the pot sections in a ready and convenient manner.

The clamps 27 form a part of a pot holding and raising and lowering frame, and are of hollow type to provide water chambers 34 for the passage of cooling water to carry off the heat, whereby the clamps will be adapted to sustain the intense heat to which they are subjected. The spindles or trunnions 32 are hollow for the passage to the water chambers 34 of cool water and for the discharge of the heated water therefrom. The bearings 33 serve the function of conducting couplings, connecting the clamps with pipes 35 in which are arranged smaller pipes 36, and said couplings 3 are closed at their outer ends against leakage by suitable plugs or stuffing boxes 37. The pipes 35 are adapted for the discharge of the hot water from the chambers 34, while the pipes 36 are designed for the supply of the cold water to said chambers, so that a constant supply of cold water to the chambers 34 and exhaust of the heated water therefrom will be insured.

The pipes 35 are connected at their upper ends with couplings 38. Each of these couplings 38, which is of the four-armed type, is provided with a lower branch 39 into which the upper end of the pipe 35 is screwed, an upper branch 40 receiving the lower threaded end of a rod 41, and lateral branches 42 and 43 with which connect flexible tubes or hose pipes 44 and 45 leading therefrom to water feed or supply and water waste or exhaust pipes or manifolds 46 and 47 extending around the furnace and supported by the reinforcing framework thereof in suitable proximity to the drawing stations. The pipes 46 and 47 are, in practice, connected respectively with the supply and outlet pipes of a suitable water supply system, whereby a constant current of cooling water may be supplied to the pot clamps and the hot water allowed to continually exhaust therefrom, it being understood that the flexible pipes leading from all the drawing units will be connected with the manifolds 46 and 47. As shown, the tube 45 communicates with the pipe 46, while the tube 44 communicates with the receiving end of the pipe 36 which extends thereinto, thus keeping the hot and cold water separate throughout the entire length of the water conduit. The tubes or hose pipes 44 and 45 are of sufficient length to permit of the up and down movements of the pot within the prescribed range and also of the movement of the pot with the frame 10 between the glass furnace and pent house.

The rods 41 terminate at their upper ends in rack toothed portions or rack bars 48 which mesh with pinions 49 upon a shaft 50, which shaft 50 carries a gear 51 meshing with the drive gear of a suitable motor driven hoisting mechanism 52, through the operation of which the shaft 50 may be driven in one direction or the other for the purpose of raising and lowering the pot 22 through the drawing opening 4 and to desired positions above and below said drawing opening, guides 53 being provided upon the frame through which the rods 41 slide to accurately guide the pot 22 in its vertical movements. The pot is preferably intended for use in connection with drain rings 54, disposed within the furnace and any number of which may be used. These rings are adapted to be brought successively into alinement with a pot from which the aftermath is to be drained, so that the aftermath draining from the pot will drain downwardly into the ring. The ring may then be pushed back into the body of the furnace out of alinement with the drawing opening, thus transferring the aftermath back into the more intensely heated portion of the furnace to be remelted and refined and preventing the direct deposit of the aftermath upon the surface of the glass immediately below the drawing opening.

The pot and draw tool supporting, raising and lowering and transporting mechanism above described may be employed in two distinct processes of drawing glass cylinders set forth in detail in my co-pending applications filed October 3, 1917, Serial No. 194,497, and filed October 15, 1917, Serial No. 196,674, each of which involves the elevation of the charge of glass in the pot and its direct exposure to the atmosphere above the plane of the drawing opening, the sealing of the drawing opening by the pot during the drawing action, and the remelting of the aftermath by the heat of the body of glass within the furnace after the drawing action. By means of the hoisting mechanism described the pot 22 may be elevated so that it will occupy the drawing opening 4 and dispose the charge of glass in the uppermost pot chamber, say the chamber of pot section 23, above the top wall 3, so that such charge of glass will be directly exposed to the cooling action of the air. This charge of glass will also be insulated and protected from the intense heat of the body of glass within the furnace by the bottom wall or walls of the pot, thus allowing the charge of glass to cool with great rapidity for a cap forming action and the drawing of the glass cylinder with great speed from the outset. The arrangement of the pot within the drawing opening will also protect the body of glass within the furnace from the cooling effects of the atmosphere, thus preventing or reducing to a maximum extent the formation of crusts or lumps on the surface of the glass, and also as a result reducing the amount of fuel necessary to keep the glass within the furnace in a properly liquefied state and at the proper working temperature. It will, of course, be understood that the pot may be either raised to a position above the top wall 3 or to a position between the top wall and surface of the body of glass in the furnace, to enable it to be reversed for the purpose of bringing into working position the lowermost pot chamber, and for draining the pot chamber containing the residue or aftermath after the glass drawing operation. The pot may then be moved downwardly into the furnace for the purpose of filling the uppermost pot chamber with glass by a dipping action and then elevated to the drawing position, or it may be brought from either of the reversing positions described into drawing position and the uppermost pot section filled by means of a ladle with a charge of glass extracted through one of the openings 5. In either case, the bottom pot section will be disposed when the pot is in working position above the level of the body of glass within the furnace and subjected to the intense heat therefrom, thus melting out the aftermath which will drop down into the floating ring 54, the glass for the drawing action being thus extracted for use from the furnace and the aftermath directly returned to the furnace, thereby enabling the drawing action to be carried out with great speed and without liability of chilling the glass within the furnace body and without the necessity of using a separate furnace, as is customary in the ordinary closed pot method. It is, of course, to be understood that a single closed bottom pot may be employed in place of the double closed bottom pot, in which event the pot will be inverted after the cylinder is drawn for the purpose of remelting the aftermath and allowing it to drain back into the furnace and is then restored to an upright position for the succeeding drawing action and refilled either by dipping or ladling as hereinbefore described. I have not herein claimed the processes referred to, or broadly set forth the means for supporting the pot for the purposes described, as the same form the subject matter of separate applications, the present invention being directed particularly to the construction of the supporting frame, overhead carriage and the hoisting and cooling means.

I claim:

1. In a glass drawing apparatus, a reversible drawing pot, hollow clamps secured to opposite sides thereof and forming fluid chambers, hollow spindles extending from said clamps and communicating with said chambers, hollow bearings in which said spindles rotate, and fluid supply and discharge pipes communicating with said bearings and forming supports therefor.

2. In a glass drawing apparatus, a reversible drawing pot, clamps engaging opposite sides of the pot, said clamps being hollow and forming water conductors, hollow spindles carried by the clamps and communicating with the water chambers thereof, hollow bearings in which said spindles are journaled, and supports composed of concentrically arranged cold water supply and hot water discharge pipes communicating with said hollow bearings.

3. In a glass drawing apparatus, the combination of a furnace having a drawing opening, water supply and discharge manifolds, a drawing pot, supports for the pot including water chambered members and water supply and discharge pipes communicating therewith, and conductors connecting said pipes with said manifolds.

4. In a glass drawing apparatus, the combination of a furnace having a drawing opening, water supply and discharge manifolds, a vertically movable drawing pot, supporting means for the pot comprising water chambered members engaging the same and concentrically arranged tubular conductors carrying said chambered members, conductors connecting the tubular conductors with the manifold, and hoisting mechanism acting upon the tubular conductors for raising and lowering the same and the pot.

5. In a glass drawing apparatus, the combination of a glass furnace having a drawing opening, an overhead support, a vertically movable pot, water chambered members engaging the pot, sets of concentrically arranged conducting tubes communicating with said chambered members, means for supplying cold water to and discharging heated water from said conducting tubes, racks connected with the conducting tubes and hoisting gear acting upon the racks for raising and lowering the conducting tubes and the pot carried thereby.

6. In a glass drawing apparatus, the combination of a glass furnace having a drawing opening, a reversible pot, clamping members engaging the pot and provided with water chambers and spindles communicating therewith, tubular supports communicating with the chambered clamps and in which the spindles of said clamps are journaled for a pot-reversing action, said tubular supports comprising outer and inner hot water discharge and cold water supply pipes, racks connected with the tubular supports, and hoisting gear meshing with said racks for raising and lowering the supports and the pot carried thereby with relation to the drawing opening.

7. In a glass drawing apparatus, the combination of a furnace having a drawing opening, an overhead track, an overhead carriage mounted on said track, a frame depending from said carriage, water supply and discharge conductors vertically movable upon said frame, a pot, water chambered supports for the pot carried by said conductors and in communication therewith, and means for raising and lowering the conductors and the pot carried thereby.

8. In a glass drawing apparatus, the combination of a glass melting furnace having a drawing opening, an overhead track, a carriage mounted upon the said track, a frame depending from said carriage, a drawing pot, chambered clamping members engaging the drawing pot, cold water supply and hot water discharge pipes communicating with said chambered clamps and vertically movable on the frame, and hoisting and lowering mechanism movable with the carriage and frame for raising and lowering said conductors and the pot carried thereby.

9. In a glass drawing apparatus, the combination of a melting furnace having a drawing opening, an overhead track, a carriage movable on said track, a frame depending from the carriage, a pot, pot supports mounted for vertical movement on the frame and provided with means for engaging and holding the pot, said supports and pot engaging and holding means forming cold water supply and hot water discharge conductors, cold water supply and hot water discharge manifolds, flexible conductors between the same and the first named conductors, and means for raising and lowering the pot and its conducting supports.

10. In a glass drawing apparatus, the combination of a melting furnace having a drawing opening, an overhead track, a carriage movable upon said track, a pot, supports engaging the pot and comprising chambered bodies, sets of concentric tubes in conducting connection with said chambered bodies and in which said bodies are journaled for reversing movements of the pot, each set of conducting supports comprising an inner cold water supply pipe and an outer hot water discharge pipe, cold and hot water discharge manifolds supported in relation to the furnace, flexible conductors between the same and the conducting supports, and hoisting and lowering mechanism movable with the carriage and frame for raising and lowering the pot and its supports.

11. In a glass drawing apparatus, the combination of a drawing pot, fluid supply and discharge manifolds, clamps engaging and extending partially around said pot and forming fluid chambers, fluid supply and discharge pipes connected to said chambers, and connections between said pipes and manifolds.

In testimony whereof I affix my signature.

WILLIAM WESTBURY.